United States Patent [19]

Mostow et al.

[11] Patent Number: 5,920,838

[45] Date of Patent: Jul. 6, 1999

[54] READING AND PRONUNCIATION TUTOR

[75] Inventors: Jack Mostow, Mt. Lebanon; Gregory S. Aist, Pittsburgh, both of Pa.

[73] Assignee: Carnegie Mellon University, Pittsburgh, Pa.

[21] Appl. No.: 08/863,505

[22] Filed: Jun. 2, 1997

[51] Int. Cl.[6] .................................................. G09B 11/04
[52] U.S. Cl. .......................... 704/255; 704/272; 704/251; 704/266
[58] Field of Search ................................... 704/270, 255, 704/246, 256, 266, 272, 251

[56] References Cited

U.S. PATENT DOCUMENTS

| | | | |
|---|---|---|---|
| 4,302,193 | 11/1981 | Haynes | 434/178 |
| 5,302,132 | 4/1994 | Corder. | |
| 5,393,236 | 2/1995 | Blackmer et al.. | |
| 5,429,513 | 7/1995 | Diaz-Plaza. | |
| 5,487,671 | 1/1996 | Shpiro et al.. | |
| 5,503,560 | 4/1996 | Stentiford. | |
| 5,511,980 | 4/1996 | Wood. | |
| 5,540,589 | 7/1996 | Waters | 704/246 |
| 5,562,453 | 10/1996 | Wen | 704/251 |
| 5,717,828 | 2/1998 | Rothenberg | 704/270 |
| 5,727,950 | 3/1998 | Cook et al. | 434/350 |

OTHER PUBLICATIONS

Aist, Gregory, "Challenges for a Mixed Initiative Spoken Dialog System for Oral Reading Tutoring", Distributed to limited AAAI-97 Spring Symposium Attendees, Mar. 24–26, 1997.

Bernstein, "Speech Recognition in Language Education", CALICO Annual Symposium, Mar. 14–18, 1994, pp. 37–41.

Burkhardt, et al., "The Exploration of Fourth Generation Language Program Generation to Assist in the Production of Multimedia Computer Aided Learning", Computer Education, vol. 12, No. 1, 1988, pp. 253–256.

Hiller, et al., "An Automated System for Computer–Aided Pronunciation Learning", Comp. Assist. Lang. Learn., vol. 7, No. 1, 1994, pp. 51–63.

Hillinger, Michael L., "Teaching Reading Comprehension with Speech–Based Courseware", Speech Tech '87 Voice Input/Output Conf., pp. 107–108, 1987.

Javkin, et al., "A Motivation–Sustaining Articulatory/Acoustic Speech Training System for Profoundly Deaf Children", 1993 Intl. Conf. On Acoustics, Speech, and Signal Processing, Apr. 27–30, 1993, pp. I–145–I–148.

Kantrov, Ilene, "Talking to the Computer: A Prototype Speech Recognition System for Early Reading Instruction", Education Development Center, Inc., 1991.

Mostow, Jack, et al., "Towards a Reading Coach that Listens: Automated Detection of Oral Reading Errors", Proceedings of the Eleventh National Conference on Artificial Intelligence (AAAI–93), Jul. 1993, pp. 392–397.

Mostow, Jack, et al., "A Prototype Reading Coach that Listens", Proceedings of the Twelfth National Conference on Artificial Intelligence, Aug. 1994, pp. 785–792.

Mostow, Jack, et al., "Demonstration of a Reading Coach that Listens", Proceedings of the Eighth Annual Symposium on User Interface Software and Technology, Nov. 15–17, 1995, pp. 77–78.

(List continued on next page.)

*Primary Examiner*—David R. Hudspeth
*Assistant Examiner*—Daniel Abebe
*Attorney, Agent, or Firm*—Kirkpatrick & Lockhart LLP

[57] ABSTRACT

A computer implemented reading tutor comprises a player for outputting a response. An input block implementing a plurality of functions such as silence detection, speech recognition, etc. captures the read material. A tutoring function compares the output of the speech recognizer to the text which was supposed to have been read and generates a response, as needed, based on information in a knowledge base and an optional student model. The response is output to the user through the player. A quality control function evaluates the captured read material and stores the captured material in the knowledge base under certain conditions. An auto-enhancement function uses information available to the tutor to create additional resources such as identifying rhyming words, words with common roots, etc., which can be used as responses.

53 Claims, 2 Drawing Sheets

OTHER PUBLICATIONS

Roth, et al., "Theoretical and Instructional Implications of the Assessment of Two Microcomputer Word Recognition Programs", Reading Research Quarterly, Spring 1987, pp. 197–218.

Russell, Martin, et al., "Applications of Automatic Speech Recognition to Speech and Language Development in Young Children", 1996, pp. 176–179.

Waters, Richard C., "The Audio Interactive Tutor", Computer Assisted Language Learning, 1995, vol. 8, No. 4, pp. 325–354.

Williams, John M., "Speech Technologies. Tech Use Guide: Using Computer Technology", Council for Exceptional Children, Center for Special Education Technology, Jan. 1990.

READING AND PRONUNCIATION TUTOR

STATEMENT REGARDING FEDERALLY FUNDED RESEARCH

The invention disclosed herein was made or conceived in the course of or under a contract with the United States Government. The United States Government may have rights in the invention.

FIELD OF THE INVENTION

The present invention is directed to reading tutors and, more particularly, to a reading tutor capable of easily capturing content.

DESCRIPTION OF THE BACKGROUND

At present, children are taught to read aloud in grades 1–3, and are expected to read silently by grade 4. Children who fail to read independently by grade 4 tend to fall further and further behind their classmates as they grow older, and are at substantial risk of growing up illiterate. Literacy is a key to educational achievement in general. Unfortunately, as many as 75% of American fourth grade students read below expected levels.

Oral reading is taught by a combination of classroom instruction and individual practice. Reading aloud helps children learn to identify printed words by relating them to the spoken form they have already learned. At this stage, children's comprehension of spoken language is typically above their independent reading level.

Listening to children's oral reading is important for several reasons. First, it can identify word identification errors so that they can be corrected. Correcting word reading errors enhances word recognition accuracy and comprehension for students with learning disabilities. Moreover, studies of spoken assistance on demand have revealed a serious flaw in assuming that young readers are willing and able to ask for help when they need it. Children with reading difficulties often fail to realize when they misidentify a word. Second, listening can detect disfluency—slow, halting reading likely to be associated with growing frustration and/or failing comprehension. Third, the very act of listening can have a powerful motivational effect, by giving young readers a supportive audience for their attempts at oral reading. Fourth, listening can be used to detect success, not just mistakes. That information can help both in identifying what the child knows, and in providing positive reinforcement when the child succeeds.

Recently, research has been undertaken with the goal of using speech recognition to provide assistance to children learning to read. Advances in technology have made the application of speech recognition to oral reading increasingly more feasible. Jack Mostow, et al., "A prototype reading coach that listens", In *Proceedings of the Twelfth National Conference on Artificial Intelligence*, (AAAI-94), Seattle, Wash., 1994; Martin Russell, et al., "Applications of automatic speech recognition in young children", In *Proceedings of the fourth International Conference on Spoken Language Processing*", Philadelphia, Pa., 1996.

When developing computer-assisted reading programs, one critical problem is acquiring narrated materials for use with the software. There are two possibilities for acquiring narrated materials, voice talent and synthesized speech. Voice talent is expensive and limits the material available for use with the reading tutor. Synthesized speech, while significantly advanced in recent years, is not as natural or as motivating as a good narrator. Another problem in developing computer-assisted reading programs is that currently available systems have the content "hard coded" with the various rules for operating the system. As a result, new content can be captured only through the substantial expense of money and effort in developing a new "hard coded" product. Thus, the need exists for a reading tutor which is capable of rapidly and easily capturing fluent speech, determining if the speech is accurate, and storing it for future use.

SUMMARY OF THE INVENTION

The present invention is directed to a method and apparatus for recording the speech of children, teachers, etc. using the reading tutor in an authoring mode or during normal tutoring activities as the source of narrations for arbitrary source material. In its broadest form, the present invention is directed to a computer implemented reading tutor comprising a player for outputting a response. An input block implementing a plurality of functions such as silence detection, speech recognition, etc. captures the read material. A tutoring function compares the output of the speech recognizer to the text which was supposed to have been read and generates a response, as needed, based on information in a knowledge base and an optional student model. The response is output to the user through the player. A quality control function evaluates the captured read material and stores that material in the knowledge base under certain conditions. An auto-enhancement function uses information available to the tutor to create additional resources such as identifying rhyming words, words with the same roots, other features in common, etc., which can be used as responses.

The present invention enables content to be created by operating the tutor in an authoring mode or during normal tutoring activities. That eliminates the time and expense of having to prepare a separate tutor for each story or group of stories. Using peers' voices has a useful educational benefit Aas well. It allows a class of students, or several classes if older students narrate for younger students, to participate together in the educational experience. Thus, the reading tutor becomes an enabler of computer-supported, cooperative, peer tutoring. Using peers' voices eliminates the need for expensive voice talent. The ability to easily capture content from either a trusted narrator or a student using the tutor provides great flexibility in the classroom. Those advantages and benefits of the present invention, and others, will become apparent from the Description of the Preferred Embodiments hereinbelow.

BRIEF DESCRIPTION OF THE DRAWINGS

For the present invention to be clearly understood and readily practiced, the present invention will be described in conjunction with the following figures wherein.

DESCRIPTION OF THE PREFERRED EMBODIMENTS

Figure 1:
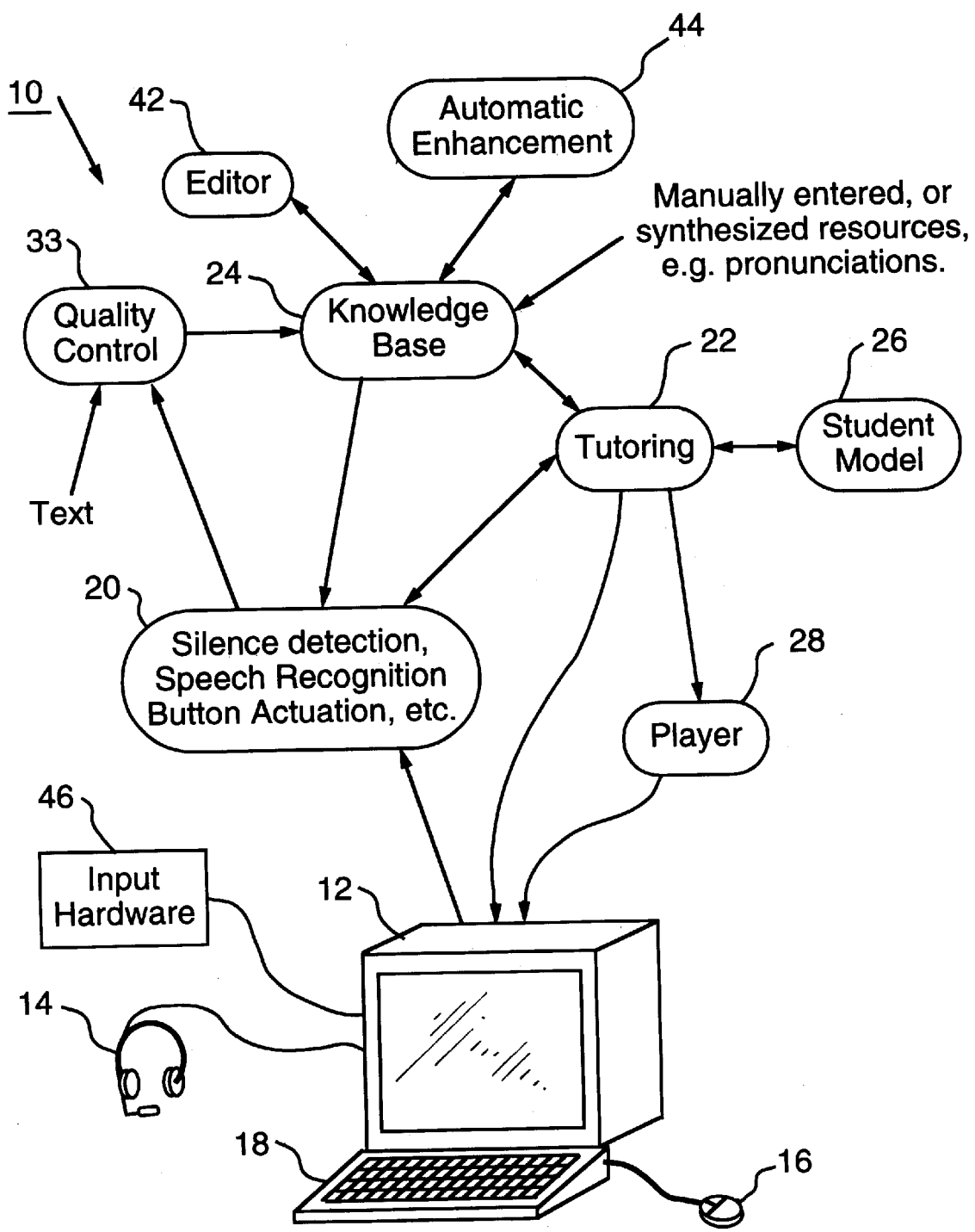
FIG. 1 is a diagram illustrating the components of a reading and pronunciation tutor constructed according to the teachings of the present invention.

A reading tutor 10 constructed according to the teachings of the present invention is illustrated in FIG. 1. The tutor 10 listens to users read aloud and then offers assistance with reading difficulties. The current version of the reading tutor 10 runs on a single stand-alone PC 12. The user may wear a headset microphone 14 and has access to a mouse 16 but not a keyboard 18, which may be present for use by teachers. The tutor 10 displays a sentence to the user on PC 12, listens to the user read aloud, and provides spoken and graphical assistance. The user may be a person of any age learning to read, trying to improve their reading skills, learning a second language, etc. The tutor 10 may also be used as an intelligent agent (smart telepromter) to present text to be read, such as a speech, to a person having a reading disability. The tutor could also be used as an aid to memorizing text or to learning, for example, a part in a script by modifying the manner in which text is displayed.

The PC 12 provides as a display, for example, a "Remote Control" window with three buttons: "Back" (move to the previous sentence), "Help" (have the tutor 10 read the sentence), and "Go" (move to the next sentence). A "dashboard" may be provided with the buttons "Story" (i.e., choose from a menu which story to read) or "Reader" (identify which student is operating the tutor 10). The user can click on a word for help. "Back", "Go", and "Story" let the reader navigate. Perfectionists can read a sentence until the tutor 10 accepts it; impatient readers can read what happens next. Novice readers can let the tutor 10 read a sentence first; bolder readers can try it first on their own. The user can click to interrupt and thus control how much they hear. The tutor 10 lets the user reread a corrected word by itself or in context. Those of ordinary skill in the art will recognize that other input buttons and input button arrangements are possible.

The PC 12 produces outputs, e.g., the user's attempt at reading, actuation of buttons, etc, which are input to block 20. Block 20 has several components performing various functions such as a continuous listener which listens for silence. The listener takes all of the input speech and places it into files. The block 20 uses a pronunciation dictionary from a knowledge base 24 and also receives information from a tutoring function 22 (such as the current sentence the user is attempting to read) to make the listening function easier to perform. The listener determines when the user is speaking and when there is silence.

Block 20 also includes a speech recognizer such as, for example, the Sphinx-II speech recognizer. We use a language model generator for the speech recognizer similar to that described in J. Mostow et al., "Towards a reading coach that listens: Automatic detection of oral reading errors", In *Proceedings of the Eleventh National Conference on Artificial Intelligence* (AAAI-93), pages 392–397, which is hereby incorporated by reference. The language model generated for a given sentence probablistically models deviations from fluent reading, highly constraining the speech recognition task, yet allowing detection of some deviations from fluent reading. The speech recognizer converts speech into words and timing information which is output to the tutoring function 22.

In block 20, each student action is classified as an abstract event. That hides from the tutoring function 22 the details of how the action was communicated. For example, clicking on the "Back" button is classified as a request to go back. Clicking on a previous sentence (displayed in gray above the current sentence) is also classified as a request to go back. That allows the tutoring function 22 to work with the logical communicative actions, not the specific interface details of how the user communicated them.

Every student action that the tutoring function 22 needs to be aware of is classified as an event by the object that processes it. Direct manipulation, such as pressing a button, is processed by classifying the event and then responding to it. For example, the "Remote Control" classifies a click on the "Help" button as a request for help and notifies the tutoring function 22 that the user has requested help. User actions related to speaking, such as the onset of speech and the end of speech, are handled by the continuous listener while partial speech recognition results (computed while an utterance is in progress) and the final recognition result (computed at the conclusion of an utterance) are handled by the speech recognizer. The tutoring function 22 is notified when these events occur, and the tutoring function 22 records the event and responds if necessary.

Each type of event recognized by the tutor 10 is assigned an event timer. An event timer is an object that measures the difference between now and when the event last occurred. There are also some special timers that represent classes of events. "Dead air time" is the elapsed time in which neither the user nor the tutor 10 has been speaking. "User turn time" is the elapsed time in the current user turn. "User idle time" is the elapsed time since any user event. "Total idle time" is the elapsed time since any event.

The tutoring function 22 operates in conjunction with a knowledge base 24 and an optional student model 26. Decisions about whether, when, how, and in what manner to intervene are made dynamically by the tutoring function 22 based on the current reading input and, if available, the student model 26. For example, if the user misreads a word, the tutoring function 22 may simply choose to highlight it and play its recorded pronunciation. Alternatively, the word could be rescued by reading the words leading up to it. If the user gets stuck trying to read a word, the tutoring function 22 may decide to supply a hint by sounding out the word, present a rhyming word, or show a video clip of someone silently mouthing the word. If a text contains a word the user is unlikely to know, the tutoring function 22 may introduce it by presenting a definition, displaying an image, or playing a sound effect. If the user has difficulty reading a phrase or sentence, the tutoring function 22 may play a fluent narration of it, pronounce the words one by one and invite the user to read along, present a textual or spoken paraphrase or explanation, or display a relevant image or video clip. The intervention chosen by the tutoring function 22 may employ synchronized audio and visual components which are implemented by a player 28.

Some tutoring function actions consist of several actions queued sequentially. For example, the tutoring function 22 can rescue the user by reading part of a sentence and then highlighting the next word. Those events are queued to the player 28 which performs them in order. The player 28 notifies the tutoring function 22 when an item has been played, and when a sequence of items has been completed. To let the tutor 10 respond to user input (e.g. mouse clicks and speech) while a sequence is playing, the player should be implemented as an asynchronous process, e.g. using a separate thread or a message driven architecture.

Currently, the tutor 10 intervenes preemptively when the sentence contains a word classified as unfamiliar by the student model 26 (e.g. which the tutor 10 has never heard the student read correctly), assistively when the student requests help or gets stuck, and correctively when the student misreads an important word (i.e., any word not in a user-definable file of function words like "aa" and "the" that are rarely vital to comprehension). If more than one important word is misread, the tutoring function 22 chooses the first one.

Given a word to help with, the tutoring function 22 currently decides what assistance to offer as follows. The pronunciation dictionary used by the tutoring function and the speech recognizer may tag certain types of expected mispronunciations, such as reversals (e.g. "was" for "saw") or substitutions (e.g. pronouncing the letter C as /K/ instead of /S/, or vice versa). If the tutoring function 22 detects one of these cases, it provides a response specific to that case, provided the knowledge base 24 contains resources for that case, such as a recording of the phrase "I thought I heard you read that word backwards." Otherwise, the tutoring function 22 randomly chooses a response from the set of responses applicable given the resources available for the word in question.

The tutoring function 22 also includes a tracking algorithm, which determines the next expected word following the last correctly read word according to the tutoring function 22, based on alignment of the partial recognition results against the text. If the misread word is not the next expected word, the tutoring function 22 reestablishes context before giving assistance for the word, by rereading the words that lead up to it, starting from the beginning of the sentence or the most recent phrase boundary (as indicated by a comma or certain other punctuation, or potentially by other heuristics).

The knowledge base 24 is comprised of text segments and associated resources. Text segments may vary in size, including letters, phonemes, words, sentences, paragraphs, pages, stories, novels, encyclopedias, and libraries. Text segments may include fragments or sequences, such as letter parts, consonant and vowel digraphs, prefixes and suffixes, onsets and rimes, syllables, word roots, and phrases. The resources associated with a text segment may be textual, pictorial, aural, and/or other forms. Resources may comprise, for example, spoken pronunciations, sound effects, definitions, explanations, paraphrases, images, video clips, or other information.

Text and the association of resources with a given text segment should be represented so as to meet several requirements. First, the ability to reuse resources should be maximized. For example, resources associated with a given word should normally be available to the tutoring function 22 for occurrences of that word in any text. Second, the association should behave appropriately when text is modified. For example, editing text should destroy the associations of sentences to narrations rendered obsolete by the revisions, but should preserve the associations of unrevised sentences to their still-valid narrations. Third, text editing should be simple for teachers and students without sophisticated computer skills. That requirement precludes such options as editing a markup language such as HTML, either in its source form or in a structured editor. Fourth, editing should be flexible, allowing users to employ any editor they prefer. Finally, the representation should support reasonably efficient processing and convenient implementation.

According to the present invention, rather than represent text associations to resources by inserting annotations in the text, we leave the text as plaintext and compute the associations as follows. Each text segment has a key computed from the segment's type and value. Its resources are then indexed by that key. That scheme may be implemented in various ways. For example, the key for a sentence may be the name of a file or folder that contains a list of resources for the text segment. The key for a word (say, "cat") may be the word itself, used both as an index into a dictionary that lists each word with its phonetic pronunciation(s), and as the name of a file "cat.wav" that contains the recorded pronunciation of the word.

In the simplest case, the key is simply the text segment itself, such as a word, phrase, or sentence. To use keys as filenames, the segment may be systematically converted into a legal filename, for example by stripping out illegal characters, truncating to an allowed limit, and/or coercing all characters to upper or lower case.

In some cases it is important to distinguish multiple occurrences of a text segment, for example, to distinguish recordings of different occurrences of the same sentence in a story. To enable such distinctions, the key may include additional information, such as the number of previous occurrences of the segment in the text, if any. For example, the key for the first occurrence of the sentence "I have a dream" in Martin Luther King's speech might be the sentence itself, but the key for the second occurrence might be "I have a dream.2." That convention permits a distinct narration for each sentence.

Some text segments, such as entire stories, are too long to serve as their own keys. Such segments have names (either natural or assigned), such as the title of a story. Their keys are computed from those names.

Some segments of different types may have the same text. For example, a story title may also be a phrase or sentence. Similarly, a letter ("A" or "I") or phoneme ("AX") may also be a word. To avoid ambiguity, the key for a text segment may therefore encode its type, e.g. "letter_A" or "phoneme_AX." Alternatively, resources for different types of text segments may be stored separately, e.g., in different directories.

By associating resources with the segments of text to which they correspond, the representation is more conducive to intelligent use of the resources in assisting the user. It also keeps editing simple and flexible, while implicitly destroying obsolete associations and preserving most of the valid ones.

The student model 26 is typically built up by the tutoring function 22 and provides the tutoring function 22 with historical information about the particular user using the tutor 10. For example, the student model 26 may contain information about words the user has trouble with, words the user has mastered, reading habits of the user (e.g. repeating words, etc.), or other information that can aid the tutoring function 22. The student model may be built up automatically and may also exploit optional user input such as age, nationality, etc.

Deciding when a reading task (e.g., reading the current sentence) is complete is a difficult matter. Rather than putting the entire burden of the decision on the user or on the tutor 10, we allow either one to make the decision to move on. That is a compromise between allowing hands-free use for good readers and providing a learner-centered environment. The tutor 10 gives the user credit for words it heard the user read correctly and in sequence. That credit accumulates across attempts at reading the sentence. When the user has received credit for every important word in the sentence, the tutor 10 moves on to the next sentence. The user can move on earlier by pressing the "Go" button.

Deciding when to intervene, if the user has not asked for help, is another difficult matter. Speech systems that use an open microphone, by necessity, interpret a period of silence at the end of an utterance as the end of a conversational turn. In the oral reading tutoring task, pauses of several seconds in the middle of an attempt at reading a sentence are not uncommon. Therefore, the standard assumptions about turn-taking behavior in spoken language systems do not apply to this task. In addition, there are times when it may be appropriate for the tutor 10 to intervene twice in a row; for example, when the student struggles with a word or is unsure of what to do next. The appropriate length of time to wait during a silence before intervening may depend on several factors, including the student, the difficulty of the text, and the last action taken by the student and the tutor 10.

Various mechanisms have been proposed to allow a tutor to take turns. Proposed solutions include dynamic constraint satisfaction, dialogue scripts, and linearly combined feature vectors. One proposed solution was to use prosodic rules to trigger backchanneling in a computerized "eavesdropper" that listened to conversations and interjected "mm" when its rule fired. We use turn-taking rules, which are similar in approach to the backchanneling rule but control the turn-taking behavior of a complete spoken language system. We instantiated the architecture in the tutor 10 and adapted the turn-taking rules to apply to the domain of oral reading tutoring. These turn-taking rules operate as follows. Besides generating events based on detected user actions, the tutoring function 22 generates its own events autonomously, based on patterns detected in the interaction of the tutor 10 with the user. For example, the tutoring function 22 might decide that it is time to take a turn based on a period of silence after the user's turn. Once a tutoring function event is generated, the tutoring function 22 responds to the event it generated by selecting a particular action, such as saying "mm-hmm," reading a word, or reading the sentence.

The tutor 10 uses seven turn-taking rules:

Interrupt the user if the user's turn is very long;

Self-interrupt (stop speaking) if the user has overlapped;

Backchannel if the user pauses;

Take a "mini-turn" if the user continues to pause;

Take a turn if the user still continues to pause;

Take a turn if you hear the end of the user's turn;

Prompt the user if nothing has happened for a while;

A mini-turn is a turn that leaves the discourse initiative with the user; it supplies content but is intended to encourage the user to continue. For example, if the user hesitates on a difficult word, the tutor 10 might supply the word to "unstick" the user.

In this domain, the tutoring function 22 may recognize the end of the user's turn (besides based on silence) when either (a) the tutoring function 22 is expecting the user to read a single word, and the speech recognizer hears the user read only that word, or (b) the speech recognizer hears the end of the current sentence (EOS). Because the speech recognizer is less than 100% accurate, the test for EOS trades off the cost of detecting EOS prematurely and consequently interrupting the user against the cost of failing to detect EOS and consequently causing an awkward delay. The current test checks if the last two words that the speech recognizer heard are the last two words in the sentence.

The forgoing rules do not fire immediately upon entering the appropriate turn-taking state. Instead, each rule has a delay associated with it that indicates how long the turn-taking state must remain in the appropriate state before the rule will fire. That delay is compared with the appropriate event timer(s). For example, the rule for backchanneling compares the backchanneling delay against the dead air timer and the user action timer. Because results from the education literature indicate that delays of more than three seconds between teacher questions and teacher-supplied answers lead to increased student learning, we set most of the timing parameters to be greater than three seconds. The exception was backchanneling because the tutor's back-channeling was not intended to be perceived by the student as taking a turn. The delay for backchanneling was originally set to 1.5 seconds, but we increased it to 2 seconds because it seemed too fast for this task. At 1.5 seconds, despite being longer than normal conversational pauses, the tutor 10 seemed to interrupt students who were struggling with difficult words. Increasing the delay to 2 seconds made the tutor 10 seem more patient.

One indication of the generality of these rules is that we added only one rule (for self-interruption) when we expanded the tutor 10 to operate in full-duplex mode, so that it could talk and listen simultaneously. However, those turn-taking rules do not fully cover the space of possible turn-taking contexts. For example, rules can be added to generate intentional tutor pauses and for processing student backchanneling.

The disclosed intervention architecture has several important properties. First, it is time-sensitive because it uses elapsed time as a key component in processing user actions and in generating responses. Secondly, it is domain-independent in that the rules about when to respond are separated from domain-specific expertise about how to respond. Finally, it allows invisible experiments to be conducted where the system varies its behavior and observes the effects of such variation on the dialogue.

In FIG. 1, the block 20, tutoring function 22, student model 26, and player 28 may be referred to as the tutor component of the tutor 10. The tutor 10 may be implemented in software. When implemented in software, the tutor 10 may reside on the main memory of the PC 12. The tutor 10 may also be carried by any type of suitable memory device or may be accessed through a network.

Tutor-mediated reading is a novel form of communication between the creator and reader of text, best understood by comparison to two previous forms. In conventional publishing, the creator controls the appearance of the text, including such aspects as font, spacing, placement of illustrations, page breaks, and so on. In Web browsers, the reader can control those factors. In tutor-mediated reading, text presentation is dynamically controlled by the tutor 10 to meet the needs of an individual user, especially one who needs assistance, for example, in reading, pronouncing, or remembering. One problem associated with reading tutors is the shortage of content, particularly when compared to conventionally published materials.

The knowledge base 24 contains resources built into the tutor 10. For example, in our current embodiment, the knowledge base 24 includes a lexicon of word pronunciations from cmudict (a pronunciation dictionary compiled at Carnegie Mellon University), and a collection of recorded words and sentences. The knowledge base 24 is, however, extended over time by the authoring, collection, and generation processes described below.

In the present invention, content in the form of text and resources may be input from any of several sources by any of several processes. Text and resources may be manually entered or imported from a pre-existing source directly into the knowledge base 24. Text may be selected or generated automatically, whether by the tutor 10 itself or by an external application. For example, the tutor 10 may decide to preface a story by presenting definitions of selected words it believes may be unfamiliar to the reader. Or an external application, such as a tutor for another domain, may dynamically supply text for the tutor to help the user read.

Figure 2:
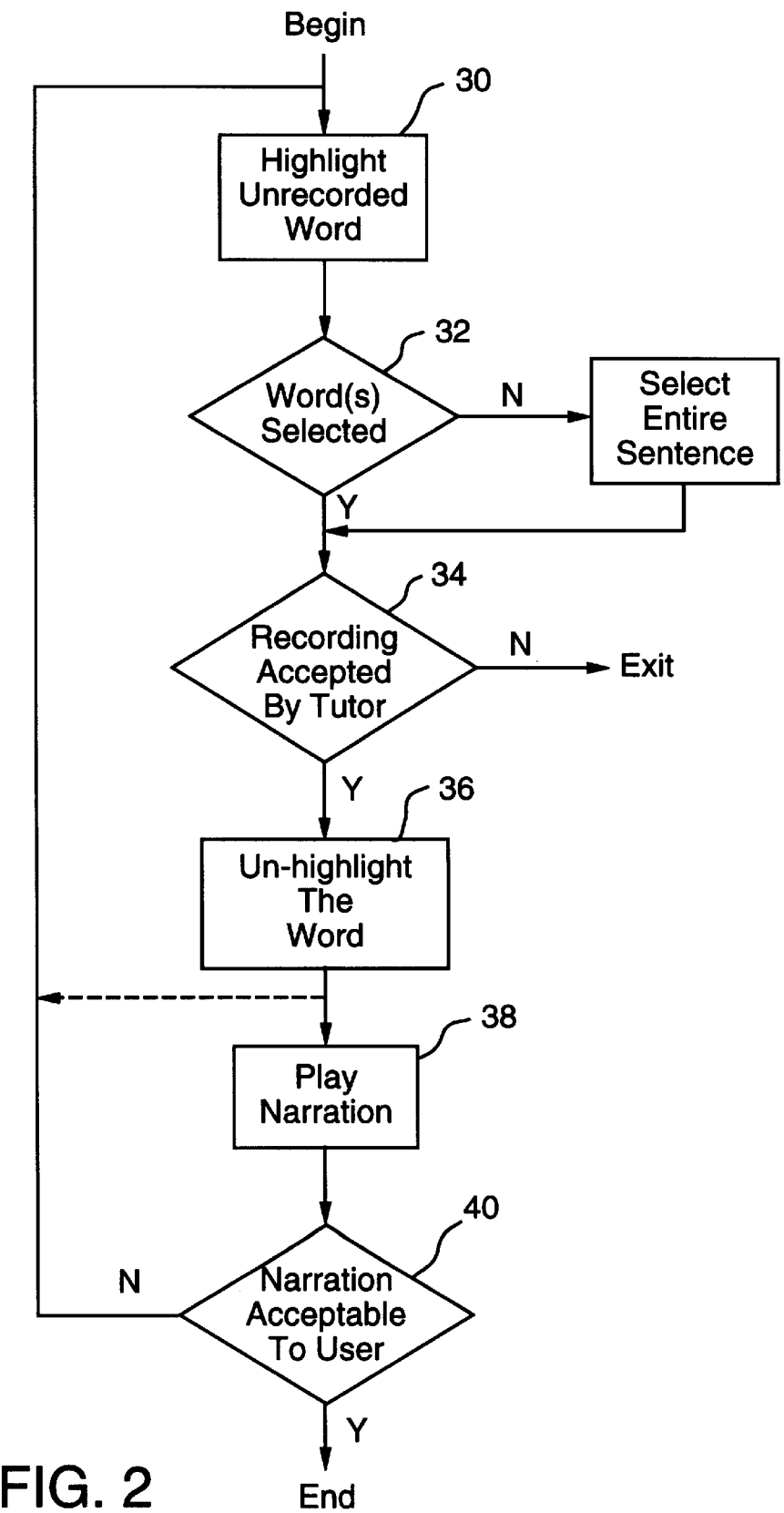
FIG. 2 is a flow chart illustrating the operation of the knowledge capture feature.

One way in which spoken resources (e.g. words and sentences) can be captured is shown in FIG. 2. At step 30, the tutor 10 presents text by incrementally adding words to the display, one sentence or sentence fragment at a time. Words without recorded spoken pronunciations are specially marked, currently in red, or otherwise highlighted. At step 32, the user may optionally select a word (or sequence of words) to narrate; otherwise the entire sentence (or fragment) is selected by default. The tutor 10, at step 34, listens for the user (author or student) to read the selected word or sequence of words, and records what the user says.

To check that the user's speech corresponds to the text, the tutor 10 performs a quality control check using a quality control function 33 shown in FIG. 1. As currently implemented, that check consists of verifying that the output of the speech recognizer exactly matches the text word(s), with no insertions, deletions, or repetitions. Based on the quality control function 33, a decision is then made at step 34 to determine if the recording is acceptable to the tutor 10. If the recording is acceptable, the highlighting of the word is removed at step 36.

Because speech recognition accuracy is imperfect, recordings that contain reading mistakes may occasionally be accepted. Quality control may be tightened by such means as thresholding on confidence estimates output by the speech recognizer, at the cost of some increase in false rejections of correct readings. Quality control can also be extended to rate the comparative quality of a recording. For example, reading rate (words per minute) can be computed and used to reject or discourage the use of readings that are too slow due to disfluency, or too fast for a student to follow along.

Quality control can also take into account the identity of the reader and the circumstances of the reading. Recordings can be captured either explicitly in an authoring mode or implicitly during normal tutor operation. The authoring mode is intended for teachers, parents, or other trusted users, and may be password-protected. In authoring mode, a word or sentence accepted as correct by the tutor 10 is echoed to the user at step 38, who can then accept or reject it at step 40. If the recording is rejected, the process may be repeated to allow for re-recording. Recordings accepted in authoring mode are therefore assumed to be correct. In normal tutoring, a reading accepted as correct is not echoed, and is marked as less reliable, i.e., probably but not necessarily correct. For example, an authoring-mode recording might be prefaced by "This says . . . ," but a normal tutoring mode recording might be prefaced by "See if this says . . . ."

The process of FIG. 2 can be modified to capture video or other types of input if appropriate input hardware 46 is available.

Once captured, text can be edited as shown by the editor 42 in FIG. 1. The text may have resources associated with it as sag discussed above. However, because of the representation which we use, when text is modified, the associations of the resources are implicitly updated. Therefore, any text editor may be used as there is no need for any type of explicit consistency maintenance function.

Some resources may be generated automatically by the automatic enhancement function 44. For example, if a word is not in the pronunciation dictionary, its pronunciation may be heuristically inferred from its spelling by the pronunciation component of a text-to-speech synthesizer. Similarly, if no human recording of a word is available, a spoken recording is generated from its pronunciation by using synthesized speech.

A number of resources are generated by heuristic algorithms that operate on the pronunciation dictionary to help compute various information useful as hints for reading a given word. Some hints involve decomposing the word into its components, whether letters, phonemes, syllables, onset (initial consonant cluster) and rime, or root word and affixes. Other hints involve relating the word to another word that rhymes, looks similar, starts or ends the same, or has the same meaning. Graphophonemic hints are computed using a combination of table lookup and heuristic algorithms to:

determine letter-sound correspondence;
decompose words into syllables;
decompose words into onsets and rimes;
identify sets of words that rhyme with each other;
identify words that look alike.

An algorithm to figure out what words rhyme and are useful to use as help follows:

Construct for each word a key that says what set it's in (equivalence class)
Split words in dictionary into onset and rime, both letters and phonemes
CAT /k aa t/
C AT /k/ /aa t/
MAT /m aa t/
M AT /m/ /aa t/
key=AT /aa t/
thus CAT and MAT have the same key, and rhyme with each other and can be used by tutor
cf. LAUGH and STAFF, which rhyme but aren't useful for the tutor.

Similar algorithms can be developed for words that start the same, and for words that look alike but sound different.

In FIG. 1, the quality control function 33, editor 42, and automatic enhancement function 44 may be referred to as the authoring component of the tutor 10.

One advantage of the present invention is that properties can be inferred from the dictionary and, thus, need not be manually encoded. The tutor 10 automatically expands its knowledge base 24 about rhyming words when words are added to the dictionary, e.g. new word PRAT /p r aa t/ will be determined to rhyme with CAT and MAT.

While the present invention has been described in conjunction with preferred embodiments thereof, many modifications and variations will be apparent to those of ordinary skill in the art. For example, other representations may be used in the knowledge base, and representations requiring explicit mapping between text and resources may be used. Resources, other than those explicitly mentioned herein, may be used, and other mechanisms for automatically enhancing the knowledge base may be employed. The foregoing description and the following claims are intended to cover all such modifications and variations.

What is claimed is:

1. A computer implemented reading tutor, comprising:
   means for outputting a response;
   means for capturing and recognizing read material;
   means for evaluating the captured read material and for generating the response, said response being input to said means for outputting; and
   quality control means,
   said means for evaluating the captured read material additionally causing said captured read material to be stored as a response in response to said quality control means.

2. The computer implemented reading tutor of claim 1 wherein said quality control means applies a confidence threshold based on a characteristic of a speaker.

3. The computer implemented reading tutor of claim 1 wherein said quality control means applies a confidence threshold based on whether the device is in an authoring mode or a tutoring mode.

4. The computer implemented reading tutor of claim 1 wherein said quality control means compares a rate of reading the captured read material to a predetermined rate of reading.

5. In combination, a computer implemented reading tutor and a knowledge base, comprising:

a knowledge base;

means for outputting a response;

means for capturing and recognizing read material;

means for evaluating the captured read material and for generating the response based on information in said knowledge base, said response being input to said means for outputting; and quality control means, said means for evaluating the captured read material additionally causing said captured read material to be stored in said knowledge base as a response in response to said quality control means.

6. The computer implemented reading tutor of claim 2 wherein said quality control means applies a confidence threshold based on a characteristic of a speaker.

7. The computer implemented reading tutor of claim 2 wherein said quality control means applies a confidence threshold based on whether the device is in an authoring mode or a tutoring mode.

8. The computer implemented reading tutor of claim 2 wherein said quality control means compares a rate of reading the captured read material to a predetermined rate of reading.

9. The computer implemented reading tutor of claim 2 wherein the information in said knowledge base includes the text of read material, at least certain of said text being associated with its own key, the information in said knowledge base additionally including a plurality of resources, said resources being associated with text through said keys.

10. A reading tutor system, comprising:

a knowledge base;

a first circuit for capturing and recognizing read material from speech;

a second circuit for comparing said captured material with the text of the read material and for generating a response based on said comparison and information in said knowledge base;

a third circuit for outputting said response;

a fourth circuit for evaluating said captured material for possible storage in said knowledge base; and a fifth circuit for storing certain of said captured material in said knowledge base based on said evaluation.

11. The reading tutor system of claim 10 wherein said fourth circuit is responsive to one of an authoring and tutoring modes.

12. The reading tutor system of claim 10 wherein the information in said knowledge base includes the text of read material, at least certain of said text being associated with its own key, the information in said knowledge base additionally including a plurality of resources, said resources being associated with text through said keys.

13. A reading tutor system, comprising:

a processor;

at least one input device and one output device in communication with said processor; and a memory, coupled to said processor, and storing a set of ordered data and a set of instructions which, when executed by said processor, cause said processor to perform the steps of:

capturing and recognizing read material from speech;

comparing said captured material with the text of the read material;

generating a response based on said comparing step and information in a knowledge base;

outputting said response;

evaluating said captured material for possible storage in said knowledge base; and storing certain of said captured material in said knowledge base based on said evaluating step.

14. The system of claim 13 wherein the information in said knowledge base includes the text of read material, at least certain of said text being associated with its own key, the information in said knowledge base additionally including a plurality of resources, said resources being associated with text through said keys.

15. The system of claim 14 wherein said memory stores an additional set of instructions which, when executed by said processor, cause said processor to perform the additional step of expanding said knowledge base.

16. The system of claim 15 wherein said memory stores instructions which, when executed by said processor, cause said processor to perform said step of expanding said knowledge base by performing the steps of:

adding text to said knowledge base; and adding resources to said knowledge base.

17. The system of claim 16 wherein said memory stores an additional set of instructions which, when executed by said processor, cause said processor to perform the additional step of associating said added resources with keys.

18. The system of claim 13 wherein said memory stores an additional set of instructions which, when executed by said processor, cause said processor to perform the additional step of generating a student model.

19. A tutoring module, comprising:

a first sequence of instructions for receiving read material from an input module;

a second sequence of instructions for evaluating said read material;

a third sequence of instructions for generating a response to said read material in response to said second sequence of instructions and information in a knowledge base; and a fourth sequence of instructions for automatically adding said read material to said knowledge base as a response when predetermined conditions are met.

20. The module of claim 19, further comprising a fifth sequence of instructions for generating a student model, and wherein said third sequence of instructions is additionally responsive to said student model.

21. The module of claim 19, further comprising a fifth sequence of instructions for controlling a player module.

22. The module of claim 19, further comprising a fifth sequence of instructions for enabling information to be manually added to said knowledge base.

23. A computer-readable medium having stored thereon instructions which, when executed by a processor, cause said processor to perform the steps of:

capturing and recognizing read material from a speech signal;

comparing said captured material with the text of the read material;

generating a response based on said comparing step and information in a knowledge base;

outputting said response;

evaluating said captured material for possible storage in said knowledge base; and storing certain of said captured material in said knowledge base based on said evaluation step.

24. The medium of claim 23 having stored thereon instructions which, when executed by said processor, cause said processor to perform the additional step of expanding said knowledge base.

25. The medium of claim 24 having stored thereon instructions which, when executed by said processor, cause said processor to perform said step of expanding said knowledge base by performing the steps of:

adding text to said knowledge base; and adding resources to said knowledge base.

26. The medium of claim 24 having stored thereon additional instructions which, when executed by said processor, cause said processor to perform the additional step of associating a key with text stored in said knowledge base.

27. The medium of claim 26 having stored thereon additional instructions which, when executed by said processor, cause said processor to perform the additional step of associating said added resources with keys.

28. The medium of claim 23 having stored thereon additional instructions which, when executed by processor, cause said processor to perform the additional step of generating a student model.

29. A computer-implemented method for responding to speech, comprising the steps of:

capturing read material from the speech;

recognizing said read material;

comparing said recognized material with text of the read material;

generating a response based on said comparing step and information in a knowledge base;

outputting said response;

evaluating said recognized material for storage in said knowledge base; and storing certain of said recognized material in said knowledge base based on said evaluation step.

30. The method of claim 29 further comprising the step of expanding said knowledge base.

31. The method of claim 30 wherein said step of expanding said knowledge base includes the steps of:

adding text to said knowledge base; and adding resources to said knowledge base.

32. The method of claim 31 further comprising the step of associating a key with each of the resources added to said knowledge base.

33. The method of claim 29 further comprising the step of generating a student model, and wherein said step of generating a response is further responsive to said student model.

34. A reading tutor system, comprising:

a processor;

at least one input device and one output device in communication with said processor; and a memory, coupled to said processor, and storing a set of ordered data and a set of instructions which, when executed by said processor, cause said processor to perform the steps of:

capturing and recognizing read material from speech;

comparing said captured material with the text of the read material;

generating a response based on said comparing step and information in a knowledge base;

outputting said response;

evaluating said captured material for possible storage in said knowledge base, said evaluating including:

marking portions of said material that have no recorded spoken pronunciations;

selecting portions of said material, including certain of said marked portions of said material;

capturing spoken pronunciations of said selected portions;

verifying that said spoken pronunciations match said selected portions;

rejecting said spoken pronunciations that do not match said selected portions;

unmarking said marked portions of said material; and storing certain of said captured material in said knowledge base based on said evaluating step, said storing including storing said spoken pronunciations that match said selected portions in said knowledge base.

35. The system of claim 34 wherein the information in said knowledge base includes the text of read material, at least certain of said text being associated with its own key, the information in said knowledge base additionally including a plurality of resources, said resources being associated with text through said keys.

36. The system of claim 35 wherein said memory stores an additional set of instructions which, when executed by said processor, cause said processor to perform the additional step of expanding said knowledge base.

37. The system of claim 36 wherein said memory stores instructions which, when executed by said processor, cause said processor to perform said step of expanding said knowledge base by performing the steps of:

adding text to said knowledge base; and adding resources to said knowledge base.

38. The system of claim 37 wherein said memory stores an additional set of instructions which, when executed by said processor, cause said processor to perform the additional step of associating said added resources with keys.

39. The system of claim 34 wherein said memory stores an additional set of instructions which, when executed by said processor, cause said processor to perform the additional step of generating a student model.

40. The system of claim 34 wherein said memory stores an additional set of instructions which, when executed by said processor, cause said processor to perform the additional steps of:

playing certain of said recorded spoken pronunciations; and receiving a response denoting the acceptability of said played spoken pronunciations.

41. A computer-readable medium having stored thereon instructions which, when executed by a processor, cause said processor to perform the steps of:

capturing and recognizing read material from a speech signal;

comparing said captured material with the text of the read material;

generating a response based on said comparing step and information in a knowledge base;

outputting said response;

evaluating said captured material for possible storage in said knowledge base, said evaluating including:

marking portions of said material that have no recorded spoken pronunciations;

selecting portions of said material, including certain of said marked portions of said material;

capturing spoken pronunciations of said selected portions;

verifying that said spoken pronunciations match said selected portions;

rejecting said spoken pronunciations that do not match said selected portions;

unmarking said marked portions of said material; and storing certain of said captured material in said knowledge base based on said evaluation step, said storing including storing said spoken pronunciations that match said selected portions in said knowledge base.

42. The medium of claim 41 having stored thereon instructions which, when executed by said processor, cause said processor to perform the additional step of expanding said knowledge base.

43. The medium of claim 42 having stored thereon instructions which, when executed by said processor, cause said processor to perform said step of expanding said knowledge base by performing the steps of:

adding text to said knowledge base; and adding resources to said knowledge base.

44. The medium of claim 42 having stored thereon additional instructions which, when executed by said processor, cause said processor to perform the additional step of associating a key with text stored in said knowledge base.

45. The medium of claim 44 having stored thereon additional instructions which, when executed by said processor, cause said processor to perform the additional step of associating said added resources with keys.

46. The medium of claim 41 having stored thereon additional instructions which, when executed by processor, cause said processor to perform the additional step of generating a student model.

47. The medium of claim 41 having stored thereon additional instructions which, when executed by said processor, cause said processor to perform the additional steps of:

playing certain of said recorded spoken pronunciations; and receiving a response denoting the acceptability of said played spoken pronunciations.

48. A computer-implemented method for responding to speech, comprising the steps of:

capturing read material from the speech;

recognizing said read material;

comparing said recognized material with text of the read material;

generating a response based on said comparing step and information in a knowledge base;

outputting said response;

evaluating said recognized material for storage in said knowledge base, said evaluating including:

marking portions of said material that have no recorded spoken pronunciations;

selecting portions of said material, including certain of said marked portions of said material;

capturing spoken pronunciations of said selected portions;

verifying that said spoken pronunciations match said selected portions;

rejecting said spoken pronunciations that do not match said selected portions;

umarking said marked portions of said material; and storing certain of said recognized material in said knowledge base based on said evaluation step, said storing including storing said spoken pronunciations that match said selected portions in said knowledge base.

49. The method of claim 48 further comprising the step of expanding said knowledge base.

50. The method of claim 49 wherein said step of expanding said knowledge base includes the steps of:

adding text to said knowledge base; and adding resources to said knowledge base.

51. The method of claim 50 further comprising the step of associating a key with each of the resources added to said knowledge base.

52. The method of claim 48 further comprising the step of generating a student model, and wherein said step of generating a response is further responsive to said student model.

53. The method of claim 48 further comprising the steps of:

playing certain of said recorded spoken pronunciations; and receiving a response denoting the acceptability of said played spoken pronunciations.

* * * * *

UNITED STATES PATENT AND TRADEMARK OFFICE
CERTIFICATE OF CORRECTION

PATENT NO. : 5,920,838  
DATED : July 6, 1999  
INVENTOR(S) : Mostow et al.

Page 1 of 1

It is certified that error appears in the above-identified patent and that said Letters Patent is hereby corrected as shown below:

<u>Column 2,</u>
Line 38, delete the "A" in "Aas".

<u>Column 4,</u>
Line 30 and 47, delete "rescued" and replace therewith -- recued --.
Line 62, delete "aa" and replace therewith -- a --.

Signed and Sealed this

Fifth Day of March, 2002

Attest:

JAMES E. ROGAN
*Attesting Officer*  *Director of the United States Patent and Trademark Office*